(12) United States Patent
Markov et al.

(10) Patent No.: US 10,235,432 B1
(45) Date of Patent: Mar. 19, 2019

(54) DOCUMENT RETRIEVAL USING MULTIPLE SORT ORDERS

(71) Applicant: Google LLC, Mountain View, CA (US)

(72) Inventors: Igor Markov, Mountain View, CA (US); Andras Csomai, San Francisco, CA (US)

(73) Assignee: Google LLC, Mountain View, CA (US)

( * ) Notice: Subject to any disclaimer, the term of this patent is extended or adjusted under 35 U.S.C. 154(b) by 187 days.

(21) Appl. No.: 15/204,869

(22) Filed: Jul. 7, 2016

(51) Int. Cl.
*G06F 17/30* (2006.01)

(52) U.S. Cl.
CPC .. *G06F 17/30554* (2013.01); *G06F 17/30324* (2013.01); *G06F 17/30336* (2013.01); *G06F 17/30424* (2013.01)

(58) Field of Classification Search
CPC ........ G06F 17/30554; G06F 17/30324; G06F 17/30336; G06F 17/30424; G06F 17/30309; G06F 17/30371; G06F 17/30351; G06F 21/44; G06F 9/547; G06F 9/485; G06F 9/466; G06F 17/30194; G06F 9/463
See application file for complete search history.

(56) References Cited

U.S. PATENT DOCUMENTS

| | | | |
|---|---|---|---|
| 5,745,894 A | 4/1998 | Burrows et al. | |
| 2003/0081846 A1* | 5/2003 | Whitehead | H04N 1/64 382/239 |
| 2005/0193005 A1* | 9/2005 | Gates | G06F 17/3002 707/E17.009 |
| 2007/0250522 A1* | 10/2007 | Perrizo | G06K 9/6282 707/E17.004 |
| 2008/0022377 A1* | 1/2008 | Chen | H04L 63/062 726/5 |
| 2008/0059492 A1* | 3/2008 | Tarin | G06F 17/30315 707/E17.005 |
| 2009/0083292 A1* | 3/2009 | Bhattacharjee | G06F 17/30492 707/E17.074 |
| 2010/0017382 A1* | 1/2010 | Katragadda | G06F 17/30976 707/E17.109 |
| 2013/0238858 A1* | 9/2013 | Greenhalgh | G06F 9/3806 711/125 |
| 2013/0268536 A1* | 10/2013 | Nachiappan | G06Q 50/01 707/741 |
| 2014/0108738 A1* | 4/2014 | Kim | G06F 12/0891 711/136 |

* cited by examiner

*Primary Examiner* — Anh Ly
(74) *Attorney, Agent, or Firm* — Fish & Richardson P.C.

(57) ABSTRACT

Methods, systems, and apparatus, including computer programs encoded on computer storage medium, to facilitate searching indexed resources associated with sort key values. In one aspect, a method includes actions of maintaining an index including a respective index entry for each of multiple resources, wherein each index entry includes a first sort key that is associated with a corresponding sort key value, receiving a query from a user device, obtaining, based on query features, a first restrict criterion that includes one or more binary value bits, determining, based on (i) the first restrict criterion and (ii) the first sort key, a first count of index entries that are each associated with a respective resource that is responsive to the query, and in response to determining that the first count of index entries satisfies the predetermined threshold, obtaining a set of index entries corresponding to resources related to the query.

19 Claims, 4 Drawing Sheets

DOCUMENT RETRIEVAL USING MULTIPLE SORT ORDERS

BACKGROUND

This specification relates to providing search results for search queries.

Search queries can be used to identify resources (e.g., web pages, images, text documents, electronic mail documents, multimedia content, etc.) that are relevant to a user's needs and to present information about the resources in a manner that is most useful to the user. A computer system may receive a search query, process the search query, identify results that are relevant to the search query, and return a set of search results in response to a user submitted query.

SUMMARY

According to one implementation, the subject matter of this specification may be embodied in a method for searching indexed resources associated with sort key values. The method may include the action of maintaining an index that includes a respective index entry for each of a plurality of resources, wherein each index entry includes a first sort key that is associated with a corresponding sort key value. Additional actions may include receiving a query from a user device, obtaining, based on features of the query, a first restrict criterion that includes one or more binary value bits, determining, based on (i) the first restrict criterion and (ii) the first sort key, a first count of index entries that are each associated with a respective resource that is responsive to the query, determining whether the first count of index entries satisfies a predetermined threshold, and in response to determining that the first count of index entries satisfies the predetermined threshold, obtaining a set of index entries that corresponds to the index entries that were used to determine the first count of index entries.

Other versions include corresponding systems, apparatus, and computer programs to perform the actions of methods, encoded on computer storage devices.

These and other versions may optionally include one or more of the following features. For instance, in some implementations, the method may include generating a set of search results responsive to the query based on the obtained set of index entries, and providing the set of search results to a user device for display.

Alternatively, or in addition, some implementations include a method that performs actions that include in response to determining that the first count of index entries is greater than the predetermined threshold, modifying the first restrict criterion by increasing a bit-length of the restrict criterion by one or more bits, determining, based on the modified first restrict criterion and the first sort key, whether the number of index entries responsive to the query satisfies the predetermined threshold, in response to determining that the number of index entries satisfies the predetermined threshold, obtaining a set of index entries that corresponds to the index entries that were used to determine the number of index entries, in response to determining that the number of index entries responsive to the query exceeds the predetermined threshold, further modifying the modified first restrict criterion by increasing a bit-length of the modified restrict criterion by one or more bits, and determining, based on the further modified first restrict criterion and the first sort key, whether the number of index entries responsive to the query satisfies the predetermined threshold.

Alternatively, or in addition, some implementations include method that performs actions that include in response to determining that the first count of index entries is less than the predetermined threshold, modifying the first restrict criterion by decrementing by one the binary value of the bit-level prefix, determining, based on (i) the modified first restrict criterion and (ii) the first sort key, whether the number of index entries responsive to the query satisfies the predetermined threshold, in response to determining that the number of index entries satisfies the predetermined threshold, obtaining a set of index entries that corresponds to the index entries that were used to determine the number of index entries, in response to determining that the number of index entries is less than the predetermined threshold, further modifying the modified first restrict criterion by decrementing by one the binary value of the bit-level prefix of the modified restrict criterion, and determining, based on (i) the further modified first restrict criterion and (ii) the first sort key, whether the number of index entries responsive to the query satisfies the predetermined threshold.

Alternatively, or in addition, some implementations include method that performs actions that include obtaining a plurality of sort key values, wherein each sort key value of the plurality of sort key values corresponds to a sort key value that is associated with an index entry of the first count of index entries, wherein the first count of index entries includes a list of multiple index entries, wherein the multiple index entries are sorted based on the sort key value, and includes a first index entry and a last index entry, comparing the sort key value of the first index entry to the sort key value of the last index entry, determining whether the sort key value that is associated with the first index entry of the multiple index entries is substantially similar to the sort key value that is associated with the last index entry of the multiple index entries, and in response to determining that the first sort key value that is associated with the first index entry is substantially similar to the sort key value that is associated with the last index entry, providing a set of search results to the user device without determining a modified restrict criterion, wherein each search result of the set of search results identifies a particular resource that is responsive to the query.

Alternatively, or in addition, some implementations include method that performs actions that include determining whether the first count of index entries exhausts a search space of index entries that are responsive to the query, in response to determining that the first count of index entries exhausts a search space of index entries that are responsive to the query, selecting a subset of index entries from the first count of index entries that satisfies the predetermined threshold, and providing a set of search results to the user device without determining a modified restrict criterion, wherein each search result of the set of search results identifies a particular resource that is responsive to the query.

Alternatively, or in addition, some implementations include method that performs actions that include in response to determining that the count of index entries is greater than the predetermined threshold, obtaining a second sort key and a second restrict identifier, determining, based on (i) the first restrict criterion, (ii) the first sort key, (iii) the second restrict identifier, and (iv) the second sort key, whether the number of index entries responsive to the query satisfies the predetermined threshold, in response to determining that the number of index entries satisfies the predetermined threshold, obtaining a set of index entries that corresponds to the index entries that were used to determine the sixth count of index entries, in response to determining that the number of index entries responsive to the query exceeds the predetermined threshold, identifying a third sort key and a third restrict identifier, and determining, based on (i) the first restrict criterion, (ii) the first sort key, (iii) the second restrict identifier, (iv) the second sort key, (v) the third restrict criterion, and (vi) the third sort key, whether the number of index entries responsive to the query satisfies the predetermined threshold.

Alternatively, or in addition, the subject matter of this specification may use sort key values that include at least one or more binary value bits that represent a floating point number, a double number, unsigned integer, a signed integer, or a character string.

The subject matter disclosed by this specification provides multiple advantages over conventional methods. For instance, the subject matter disclosed by this specification facilitates search of indexes using multiple sort orders in large databases efficiently in a manner that is fast and requires small storage overhead. In some instances, the aforementioned increase in search efficiency may be achieved, at least in part, by skipping irrelevant resources when executing a search. For example, in some instances, a system using the subject matter disclosed by this specification may execute a search in a manner that ignores index entries that have irrelevant sort key values.

These and other versions each may optionally include one or more of the following features.

DETAILED DESCRIPTION

Figure 1:
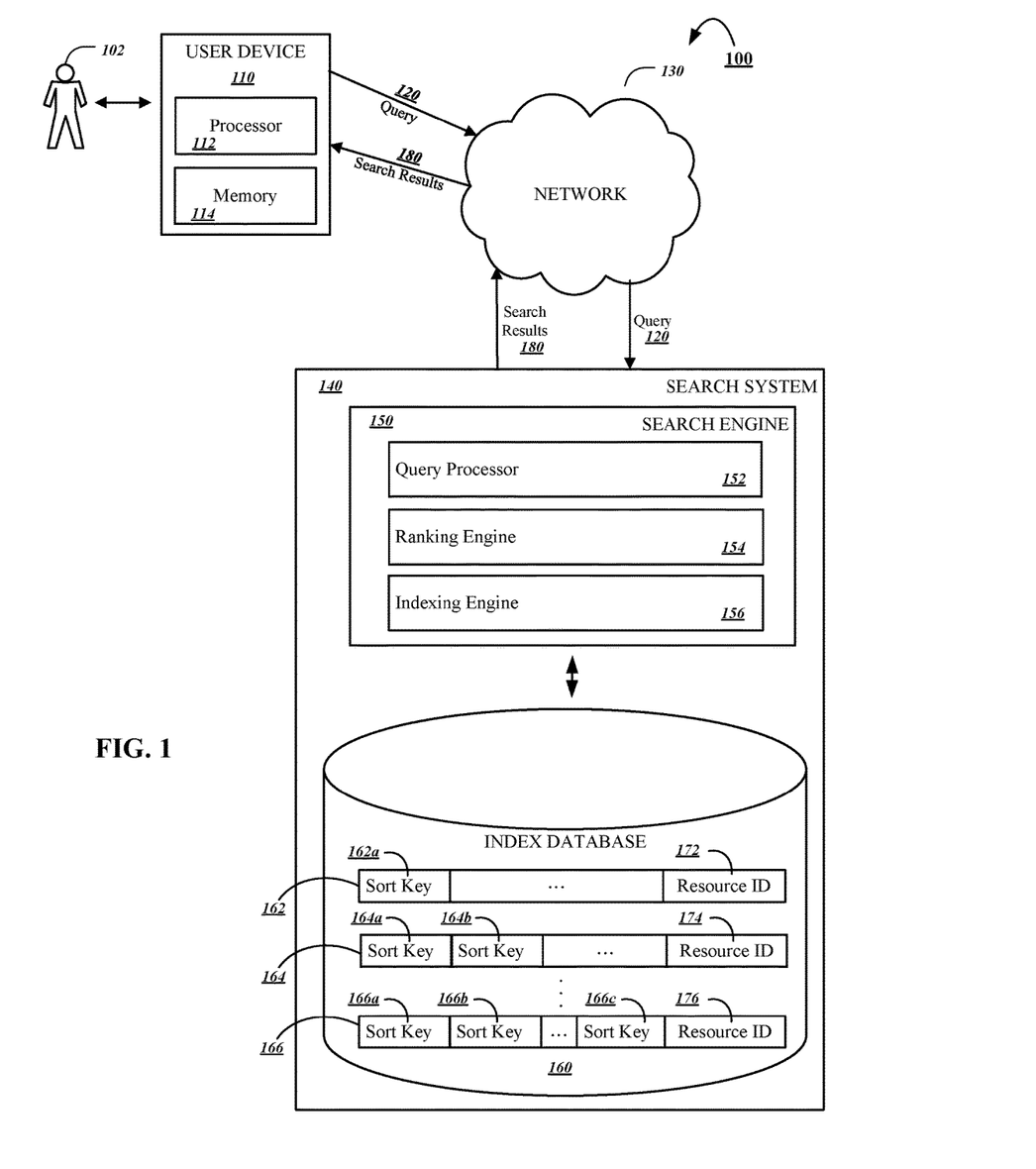
FIG. 1 shows an example of a system that facilitates an iterative, bit-level search and retrieval of resources that are indexed using one or more sort keys.

FIG. 1 shows an example of a system 100 that facilitates an iterative, bit-level search and retrieval of resources that are indexed using one or more sort keys. The system 100 includes a search system 140. The search system 140 may be implemented as computer programs on one or more computers in one or more locations, in which the systems, components, and techniques described below can be implemented.

A user 102 may interact with the search system 140 through a user device 110. For example, the user device 110 can be a computer coupled to the search system 140 through a data communication network 130, e.g., a local area network (LAN), a wide area network (WAN), a cellular data network, the Internet, or a combination of these or other networks. In some cases, the search system 140 can be implemented on the user device 110. The user device 110 may generally include a processor 112 for executing stored instructions and a memory, e.g., a random access memory (RAM) 114, for storing instructions and data. The memory can include both read only and writable memory.

A user 102 can use the user device to enter and submit a query 120 to the search system 140. Once submitted, the query 120 may be transmitted through the network 130 to the search system 140. A search engine 150 within the search system 140 performs a search to identify resources matching the query. Generally, the search engine 150 includes a query processor 152, a ranking engine 154, and an indexing engine 156.

The query processor 152 receives and executes query 120 to identify resources that are responsive to the query 120 from resources that are indexed in the index database 160. For instance, the query processor 152 may identify resources that are indexed by index entries 162, 164, 166 as being responsive to the query 120. The query processor 152 may generate a set of search results that is responsive to the query 120 based on the resources identified by the query processor 152. The set of search results may include one or multiple search results.

Alternatively, the query processor's 152 search may yield a determination that none of the resources indexed by index database 160 are responsive to the query 120. In such instances, the query processor 152 may generate a search results page that indicates that no resources indexed by index entries in the index database 160 were responsive to the query 120.

The search engine 150 can determine a particular order for a generated set of search results that corresponds to resources that were identified as responsive to the query 120. In some aspects, the particular order of the ordered list of search results 180 may be based on, e.g., the order of sort key values associated with each index entry 162, 164, 166 identified by the query 120. Alternatively, or in addition, the ranking engine 154 may generate one or more scores for each resource that is determined to be responsive to the query 120. In such an implementation, the search engine 150 can order search results based, at least in part, on the generated scores. The ordered list of search results 180 may then be provided to the user device 110 using network 130. The user device 110 may output the ordered set of search results using an application such as, e.g., a web browser, that is running on the user device 110.

The indexing engine 156 may obtain data identifying one or more resources (or portions thereof), metadata associated with the one or more resources, or both. For example, the indexing engine 156 may obtain resources or metadata using a web crawler that scans the network 130 in order to identify resources. Alternatively, for example, the indexing engine 156 may obtain resources or metadata that have been uploaded to, or otherwise received by, a document management system, an email system, or the like. The indexing engine 156 may analyze the obtained resources or metadata in order to generate index entries such as, for example, index entries 162, 164, 166 for each identified resource. Index entries may be used to look up resources that are stored in a database. Each index entry, e.g., index entry 162, may include one or more sort keys, e.g., sort key 162a, and a resource identifier, e.g., resource identifier 172. A resource identifier 172 may provide a reference to the server, or other computer, that hosts the resource associated with an index entry. Alternatively, the resource identifier 172 may be a unique identifier that can be used to look up the location of a resource that may be stored in one or more other databases.

Analyzing obtained resources, by the indexing engine 156, may include extracting data from a resource, or the resource's metadata, that can be used to generate an index entry 162, 154, 166. For instance, the indexing engine 156 may identify data associated with a resource that can be used as a sort key, a sort key value, or both. The indexing engine 156 may associate the identified data with a particular sort key, add the particular sort key to the resource's index entry, if the particular sort key is not already associated with the index entry, and assign a sort key value to the particular sort key that corresponds to the identified data.

Thus, a particular index entry sort key may be derived from a particular value that is associated with a resource or the resource's metadata. For example, if the resource identified by the particular index entry 166 is an electronic mail document, the sort keys 166a, 166b, 166c may each be associated with attributes of the electronic mail document. For instance, sort key 166a may correspond to the time the electronic mail document was received by a recipient, sort key 166b may correspond to the date that the electronic mail document was received by the recipient, and the sort key 166c may correspond to whether the electronic mail document is read or unread. However, other types of sort keys may exist for other types of resources. For instance, sort keys may also be established regarding the size of a resource, the quality of the resource, the creation time of the resource, name of a resource author/creator, or the like.

In some instances, the indexing engine 156, or other component of system 140, may determine that a sort key value identified in a particular document exceeds a predetermined size, predetermined character length, or other predetermined criterion. In such instances, the indexing engine 156 may split the identified sort key value into two or more sort key values that are each to be associated with a separate sort key. For instance, the indexing engine 156 may identify the sort key value "John Doe" in a resource that corresponds to a sort key "name." In one implementation, the indexing engine 156 may split the sort key value "John Doe" into two separate sort key values that are each to be associated with separate sort keys such as "first name" and "last name," respectively.

Each particular sort key may be assigned a particular sort key value. Each assigned sort key value may be derived from the particular resource that the sort key is associated with. Alternatively, or in addition, assigned sort key values may be derived from metadata associated with the particular resource. For instance, continuing the example set forth above, sort key 166a may be assigned a sort key value of '0130' that indicates that the electronic mail document was received by the recipient at 1:30 am, sort key 166b may be assigned a value of '04112016' that indicates that the electronic document was received on Apr. 11, 2016, and sort key 166c may be assigned a Boolean value of "1" which may indicate that the recipient has read the electronic mail document.

The indexing engine 156, or other component of search system 140, may convert the sort key value associated with one or more particular sort keys into a value that can be represented with bits. For example, in some implementations, each sort key value may be converted into a string of one or more binary digits. In such implementations, each sort key value may include, for example, a 32-bit binary number, a 64-bit binary number, or the like. The sort key value may then be stored in the index entry that corresponds to the resource from which the sort key value was derived.

The sort key values may represent any type of sort key value including unsigned integers, signed integers, character strings, floating point types, double types, or the like. Sort keys other than unsigned integers are handled using order-preserving bijections. For instance, an order-preserving bijection may include one-to-one functions f( ) and g( ) such that for any A, B, x and y, the following equations hold:

$f(g(A))=A$, $g(f(y))=y$, if $(x<y)$ then $f(x)<f(y)$, if $(A<B)$ then $g(A)<g(B)$.

By way of example, the bijection function for signed integers unconditionally flips the most significant bit. For four-character strings, the character ordering may be reversed, and the resulting bits may be interpreted as an unsigned integer. For floating-point numbers, the bijections may rely, e.g., on the IEEE 754 standard for the 'float' and 'double' types.

The indexing engine 156 may establish one or more restrict criterions. A restrict criterion may include, for example, any constraint that may imposed on a set of indexed resources. In some implementations, a restrict criterion may include a string of binary digits that includes one or more binary bits. The string of binary digits used to create restrict criterions may be generated for each sort key by expressing the corresponding sort key values for each resource as respective strings of binary digits. By way of example, the sort key value of a particular sort key may be expressed in a string of binary digits such as "010111". Then, the indexing engine 156 may evaluate each of the binary prefixes associated with the string of binary digits that is used to express the sort key value. With reference to the aforementioned example, the string of binary digits "010111" may yield binary prefixes of " ", "0", "01", "010", "0101" "01011", and "010111", respectively.

Once a set of binary prefixes for each sort key value is determined, the indexing engine 156 may determine which binary prefixes are to be indexed. In some instances, an indexing engine 156 may index each binary prefix in the set of all identified binary prefixes. Alternatively, an indexing engine 156 may index only a subset of the identified binary prefixes of the set of all identified binary prefixes. For instance, the indexing engine 156 may index only the even binary prefixes, only the odd binary prefixes, or another different subset of the binary prefixes. Once a respective index entry has indexed the set, or subset, of the identified binary prefixes, the indexing engine 156 may associate one or multiple resource identifiers with each binary prefix that has been indexed. The indexing engine 156 may associate a resource identifier with an indexed binary prefix if the resource identified by the resource identifier is associated with a sort key, from which the binary prefix was derived, that has a particular sort key value with a prefix that satisfies the binary prefix.

The restrict criterion may be applied to bit-level sort key values that are associated with index entries maintained in the index database 160 in order to create a list of ordered resource index entries. For instance, the indexing engine 156 may establish a restrict criterion for a particular sort key that comprises a string of binary digits having the most significant bits "110". Such a restrict criterion can be used to identify an ordered list of index entries in the index database 160 that have the most significant bits of "110." Though this is an example of a single ordered list of index entries based on the application of a single restrict criterion to a particular sort key value, it is contemplated that indexing engine 156, or other component of searching system 140, may create multiple different ordered lists of index entries that are each based on a respective restrict criterion. These ordered lists may be accessed during the search system's execution of a received query in order to facilitate identification of the most relevant search results.

The multiple ordered lists of index entries, each of which are based on a respective restrict criterion, may be maintained by the index database 160. In some aspects, the index database 160 may be allocated across one or more different types of storage devices in order to optimize performance of the index. For instance, one or more portions of index database 160 may be stored in memory (e.g., RAM), flash storage, and/or one or more disk drives. In one aspect, lists of index entries that are established using a restrict criterion that include more than a predetermined number of index entries may be stored in RAM. By way of example, each list of index entries that is established using a restrict criterion that includes more than 5,000 index entries may be stored in RAM. In this example, all other lists of lists of index entries may be stored in flash storage. However, the index database 160 may be allocated in other ways between each of the different types of storage devices, as necessary.

Query processor 152 may perform iterative bit-level searching of sort key values assigned to one or more sort keys, based on, restrict criterions imposed by the indexing engine 156. The iterative bit-level searching of sort key values may be performed after the search system 140 receives the query 120 from the user device 110 and obtains a set of documents responsive to the query 120. For instance, upon the receipt of a user query 120, the query processor 152, or other component of search system 140, may obtain an initial set of index entries that correspond to resources that are responsive to the query 120. Then, the query processor 152 can search the initial set of index entries corresponding to the resources that are responsive to the query 120 based on a particular restrict criterion.

For instance, the user may submit a query for the most recently published patent documents that include the keyword "widget." In this example, the query processor 152 may first identify an initial set of index entries that correspond to resources that are responsive to the keyword "widget." Then the query processor 152 can obtain a restrict criterion, and search a publication date sort key that is associated with each index entry of the initial set of index entries for those index entries that have a publication date sort key value that matches the obtained restrict criterion. In this example, the query processor 152 may obtain a restrict criterion having a binary value with a most significant bit of "1" because the exemplary search query specified a request for the patent documents whose index entries that are associated with a publication date sort key having the highest value (e.g., most recent date) of the set of publication date sort keys for the identified index entries.

Query processor 152 can determine whether a count of initial index entries that corresponds to the resources responsive to the query 120 satisfies a predetermined threshold. Based on a determination, the query processor may determine to modify the restrict criterion (e.g., change the restrict criterion to a most significant bit of "0", increase the amount of bits used by the restrict criterion to "11", or the like), and search the index database 160 again in an attempt to identify more or less index entries corresponding to resources responsive to the query 120. Each time the query processor 152 modifies the restrict criterion, and performs a subsequent search, the query processor searches a different sort order maintained by the index database 160. The query processor 152 may iteratively continue this process until a satisfactory number of index entries corresponding to resources that are responsive to the query 120 are identified.

In this specification, the term "database" will be used broadly to refer to any collection of data: the data does not need to be structured in any particular way, or structured at all, and it can be stored on storage devices in one or more locations. Thus, for example, the index database 160 can include multiple collections of data, each of which may be organized and accessed differently. Similarly, in this specification, the term "engine" will be used broadly to refer to a software based system or subsystem that can perform one or more specific functions. Generally, an engine will be implemented as one or more software modules or components, and installed on one or more computers in one or more locations. In some cases, one or more computers will be dedicated to a particular engine; in other cases, multiple engines can be installed and running on the same computer, or computers. Similarly, in this specification, the term "resource" will be used broadly to refer to any item of content that may be accessible using a computer including, e.g., web pages, images, text documents, multimedia content, or the like. In some instances, a "resource" may be locally stored on and/or retrieved from a local storage device. In other instances, a "resource" may be remotely stored on and/or retrieved from a remote storage device using a network connection.

Figure 2:
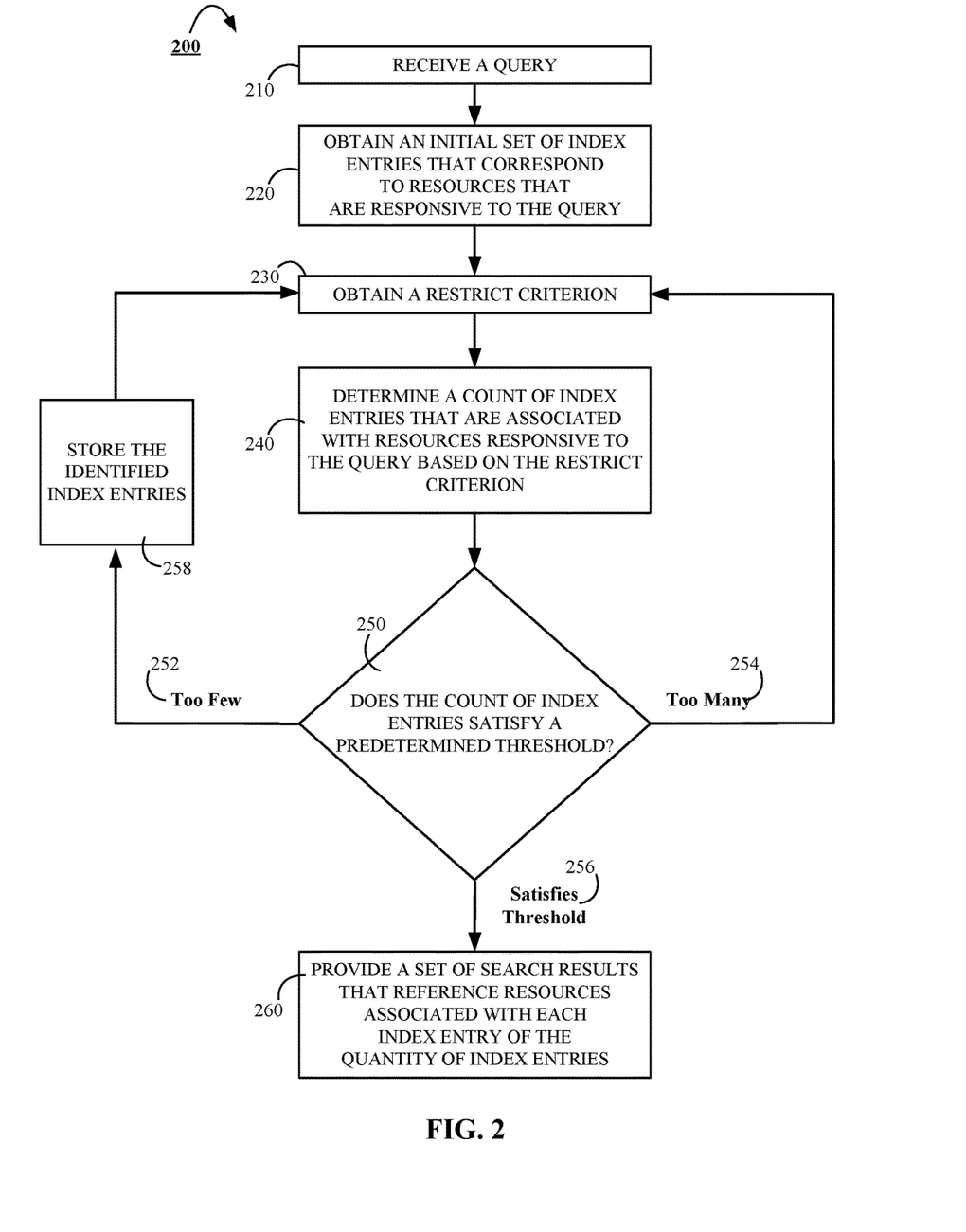
FIG. 2 is a flowchart of an iterative process for performing bit-level search and retrieval of resources that are indexed using one or more sort keys.

FIG. 2 is a flowchart of an iterative process 200 for performing bit-level search and retrieval of resources that are indexed using one or more sort keys. For convenience, the process 200 will be described as being performed by a system of one or more computers located in one or more locations. For example, a search system, e.g., the search system 140 of FIG. 1, appropriately programmed in accordance with this specification, can perform the process 200.

The system receives 210 a query. The query may be a query that was entered into a user device by a user, and transmitted by the user device to the system over a network. In some instances, the query may be generated in response to a user interaction with an application running on the user device 110. Though a single user interaction may result in the generation of a single query, the subject matter disclosed by this specification is not so limited. For instance, a single user interaction with an application running on the user device 110 may result in the generation of multiple queries. In the same, or other, instances, queries may be generated and submitted in ways other than an explicit input of a query by a user via user device 110. For instance, the search query may be generated and transmitted by an application operating on a user device. Once the query is received, the system obtains 220 an initial set of index entries that corresponds to resources that are responsive to the query. For instance, in response to the receipt of a query requesting the most recently issued patent documents that include the keyword "widget," the system may obtain an initial set of index entries that correspond to patent documents that include the term "widget."

The system obtains 230 a restrict criterion that may be used to facilitate search of sort key values maintained by a resource index. The restrict criterion may be selected based on one or more features of the received query. For instance, as described above, a query may be received that requests the identification of the most recently issued patent documents that include the term "widget." In this example, the search system may choose a restrict criterion that includes the most significant bits of "111" in an effort to identify index entries that have the highest (e.g., most recent) sort key values for a publication date sort key. Selecting a three-bit restrict criterion as opposed to a single-bit or two-bit restrict criterion may reduce the number of index entries that satisfy the restrict criterion.

In some instances, one or more features associated with the query may be input by the user submitting the query. However, in other instances, one or more features of the query may be automatically added by an application. For example, a user may provide data in association with a query that is indicative of a user request for the most recently received electronic mail documents. In this example, the search system may select a restrict criterion with a most significant bit of "1" in order to find the index entries corresponding to electronic mail documents having the highest (e.g., most recent received date) sort key values for the sort key corresponding to electronic document receipt date. Alternatively, a user request for the oldest electronic mail documents that were received may be submitted by the user. In such an instance, the search system may select a restrict criterion with a most significant bit of "0" in order to find the index entries corresponding to electronic mail documents having the lowest (e.g., oldest messages by receipt date) sort key values for the sort key corresponding to electronic mail document receipt date. Alternatively, a user may provide data in association with a query that is indicative of a request for the highest quality documents. In such an example, the search system may select a restrict criterion with a most significant bit of "1" in order to find the index entries associated with documents having the highest (e.g., best quality) sort key values for a sort key corresponding to a quality score. Alternatively, a user may provide data associated with a query that is indicative of a request for the lowest quality documents, in such an example, the search system may select a restrict criterion with a most significant bit of "0" intended to identify the index entries associated with documents having the lowest (e.g., worst quality) sort key values for a sort key corresponding to a quality score.

In yet other examples, an application may automatically provide data in association with a query that may be used by the search system to obtain a restrict criterion. For instance, after a user logs into an email client, the email client may send a query for the most recently received electronic mail documents. In such an instance, the search system may select a restrict criterion with a most significant bit of "1" in order to find index entries corresponding to the electronic mail documents having the highest (e.g., most recent received date) sort key value for the sort key corresponding to electronic document receipt date.

The description above provides examples of (1) restrict criterion wherein a most significant bit of "0" is selected to identify the lowest ranked (e.g., oldest messages by receipt date) resources and (2) restrict criterion wherein a most significant bit of "1" is selected to identify the highest ranked (e.g., most recent received) resources. However, the present disclosure need not be so limited. For instance, there may be instances wherein a most significant bit of "0" is utilized to find the best ranked resources for any particular sort key. In addition, it is also contemplated that the search system may initially determine to use a restrict criterion that includes multiple bits. For instance, the search system may select a restrict criterion of "11," "10," "01," "00," "111," "110," "101," "100," "011," "010," "001," "000," "1111," or the like.

Once the system has obtained a restrict criterion, the system determines 240 a count of index entries that correspond to resources that are responsive to the query based at least on the restrict criterion. In some instances, the count of index entries may be described, e.g., as a value that indicates the number of index entries that correspond to resources that are responsive to the received query.

The search system may determine 240 the count of index entries associated with resources that are responsive to the query by searching a sort key associated with a set of identified index entries based on the obtained restrict criterion. In some implementations, the particular sort key that will be searched may be based on one or more features of the query. For instance, in the example discussed above, a restrict criteria of "111" was obtained in order to identify the most recently issued patent documents that include the term "widget." The search system may perform a search of the initial set of index entries corresponding to patent documents that include the term "widget" in an effort to identify a subsequent set index entries that each have a publication date sort key with a sort key value having the most significant bits of "111." In one implementation, the search system may utilize a binary search algorithm in order to search the sort key values using the restrict criterion. Once a subsequent set of index entries that include a publication date sort key with a sort key value having the most significant bits "111" has been identified, the system can determine the count of the subsequent set of index entries by calculating the sum of each of the index entries in the subsequent set of index entries. In this example, the publication date sort key was searched because the query requested the most recently issued patent documents that include the term "widget." In other words, the publication date sort key corresponds to the feature of the query requesting patents according to the issue date, or publication date, of the patent.

Determining the count of the number of index entries that are associated with resources that are responsive to the query at stage 240 may not necessarily require counting every index entry that is associated with resources that are responsive to the query. For instance, the search system may determine a count of all index entries that are associated with resources that are responsive to the query at stage 240 if the number of index entries that are associated with resources that are responsive to the query is less than, or equal to, the predetermined threshold number of resources sought by the query. Alternatively, however, the search system may determine a count of less than all index entries that are associated with resources that are responsive to the query at stage 240 if the system determines that the count of index entries responsive to the query exceeds the predetermined threshold number of resources sought by the query. For instance, the search system may stop counting the number of index entries that are associated with resources that are responsive to the query at stage 240 once the search system determines that the count of index entries that are associated with resources that are responsive to the query exceeds the predetermined threshold number of resources sought by the query. By way of example, assume there is a scenario where a query requests the ten highest quality documents. In such an example, though there may be ten million index entries that are associated with documents that are responsive to the query, the search system may stop counting the number of index entries that are associated with the documents that are responsive to the query at stage 240 once the search system has identified eleven documents that are responsive to the query. Thus, though it may be possible for the search system to determine a count of all index entries that are associated with resources that are responsive to the query at stage 240, the search system may employ an optimized algorithm, as described above, that may count less than all the index entries that are responsive to the query in certain instances. The count of less than all of the index entries that are responsive to the query may be utilized so long as the count is sufficient to determine that the number of index entries responsive to the query exceeds a predetermined threshold number of resources sought by the query.

The search system may determine 250 whether the count of index entries that correspond to resources that are responsive to the query satisfies a predetermined threshold. For instance, the search system may be configured to identify the ten best documents that are responsive to the received query. In this example, the search system may try to identify the ten most recently issued patent documents that include the term "widget."

At stage 250 the system may determine whether the count of index entries associated with resources that are responsive to the query falls below the predetermined threshold 252, exceeds the predetermined threshold 254, or satisfies the predetermined threshold 256. In some aspects, a count of index entries associated with resources that are responsive to the query may satisfy the predetermined threshold if the count of index entries associated with resources that are responsive to the query is equal to the predetermined threshold. In such a system, by way of the continuing example discussed herein, only a count of index entries equal to ten would satisfy the threshold. Furthermore, in such an implementation, a count of index entries would exceed the predetermined threshold at eleven or more index entries and fall below the predetermined threshold at nine or less index entries.

However, in other aspects, a count of index entries associated with resources that are responsive to the query may satisfy the predetermined threshold if the count of index entries falls within a range of index entries established by the predetermined threshold. For instance, a predetermined threshold may be configured to be a range of 8-12 ten resources. Thus, in such a system, and by way of the continuing example discussed herein, a count of index entries equal to eleven would satisfy the predetermined threshold. In such an implementation, a count of index entries would exceed the predetermined threshold at thirteen or more index entries and fall below the predetermined threshold at seven or less index entries. The predetermined threshold may be established by the user, by an application on the user device, or the search system.

Once it is determined 250 that the count of index entries satisfies the predetermined threshold, the system may obtain a set of index entries that corresponds to the index entries whose count satisfied the threshold at stage 250. A set of query results responsive to the received query may be generated based on the obtained set of index entries. At stage 260, the process may conclude when the search system provides a set of search results to a user device for display that is responsive to the query. Each search result of the set of search results may include a reference to a resource that is responsive to the query.

If the system determines that the count of index entries exceeds the predetermined threshold, the process 200 may return to stage 230 and determine a modified restrict criterion in order to reduce the count of index entries associated with documents that are responsive to the received query. For instance, in response to a determination that the count of index entries exceeds the predetermined threshold, the search system may add one or more bits to the previously used restrict criterion. In the example provided above, the search system obtained a restrict criterion that includes the most significant bits of "111." In this example, if it is determined that the count of index entries exceeds the predetermined threshold, the search system may select a modified restrict criterion of "111111."

Once the modified restrict criterion is selected, the system may continue the process by determining 240 a count of index entries associated with resources that are responsive to the query based on the modified restrict criterion. The count of index entries may include a count of all index entries that are associated with resources that are responsive to the query, or a count that is sufficient to determine that the number of index entries that are responsive to the query exceeds the predetermined threshold number of documents that are sought by the query. The system may compare the count of index entries to the predetermined threshold at 250 to determine whether the count of index entries associated with resources that are responsive to the query falls below the predetermined threshold 252, exceeds the predetermined threshold 254, or satisfies the predetermined threshold 256. The system may continue to iteratively cycle stages 230, 240, and 250 so long as the count of index entries exceeds the predetermined threshold. Once it is determined 250 that the count of index entries satisfies the predetermined threshold, the system may continue the process 200 at stage 260. At stage 260, the search system provides a set of search results that is responsive to the query, as described above.

In some implementations, other functionality may be performed at stage 230 in order to reduce the count of index entries that are responsive to the query. For instance, in some instance, it may be determined at 250 that an identified count of index entries exceeds the predetermined threshold of index entries due to the existence of multiple index entry ties. Index entry ties may result, for example, when multiple index entries are identified that include the same, or substantially similar, sort key value. In such instances, the system may determine it is appropriate to add an additional sort key to the query at stage 230 during a subsequent pass through the process 200.

By way of example, a first iteration through process 200 may identify a quality score sort key and obtain a restrict criterion at 230 that is used to search 240 web page quality score sort key values that are associated with those index entries that were obtained 220 as being responsive to the search query. During this first iteration of process 200, it may be determined at stage 250 that the identified count of index entries exceeds the predetermined threshold of index entries because there existed multiple resources that were associated with the same, or substantially similar, quality score sort key value.

To break the tie that results from the identification of multiple index entries having the same sort key value, and reduce the count of index entries that are relevant to the received query, a second iteration through process 200 may be performed. During the second iteration through process 200, the system may identify a second sort key and obtain another restrict criterion at 230 that is used to search the sort key value associated with the second sort key. For instance, a website update time sort key may be identified. Then, a second restrict criterion may be obtained that can be used to search the website update time sort key values that are associated with the index entries in the count of index entries identified during the first iteration of process 200. This subsequent pass through process 200 may determine 240 the count of index entries that are (i) associated with a first sort key value (e.g., quality score sort key value) that satisfies a first restrict criterion and (ii) associated with a second sort key value (e.g., website update time sort key value) that satisfies a second restrict criterion. The system may continue this process at step 250 by determining whether the count of index entries satisfies a predetermined threshold. The system may continue to iteratively cycle this variation of stages 230, 240, and 250, adding one or more sort keys with each iteration, so long as the count of index entries exceeds the predetermined threshold. Once it is determined 250 that the count of index entries satisfies the predetermined threshold, the process 200 may continue to stage 260. At stage 260, the search system provides a set of search results that is responsive to the query, as described above.

In the aforementioned example, the process of adding an additional sort key at stage 230 during a subsequent pass through process 200 was discussed in the context of breaking index entry ties. However, it is contemplated that additional sort keys can be introduced at stage 230 during a subsequent pass through process 200 for other reasons. For instance, additional sort keys can be introduced at stage 230 in order to reduce the number of index entries that may be identified as relevant to a received query.

If it is determined at 250 that the count of index entries falls below the predetermined threshold, the process 200 may store 258 the set of identified index entries that are associated with each of the index entries identified in stage 240, and then return to stage 230 to determine a modified restrict criterion in order to try and increase the count of index entries associated with documents that are responsive to the received query. For instance, when the received query is seeking a particular number of resources that have the highest sort key values for a particular sort key and the search system determines that the count of index entries falls below the predetermined threshold, the search system may decrease the value of the binary restrict criterion. In one implementation, the search system may decrease the binary value of the restrict criterion in descending order by one. In the example provided above, the search system selected a restrict criterion that includes the most significant bits of "111." In this example, if it is determined that the count of index entries falls below the predetermined threshold, the search system may select a modified restrict criterion of "110."

Alternatively, when the received query is seeking a particular number of resources that have the lowest sort key values for a particular sort key and the search system determines that the count of index entries falls below the predetermined threshold, the search system may increase the binary value of the obtained restrict criterion in ascending order by one. For instance, if the obtained restrict criterion in such a scenario included the most significant bits of "000," then the search system may obtain a modified restrict criterion of "001."

Once the modified restrict criterion is selected, the process may continue to determine 240 a count of index entries that correspond to resources that are responsive to the query based on the modified restrict criterion. In this iteration, the system may seek a particular number of index entries that is equal to the predetermined threshold of index entries minus the number of index entries stored at step 258. The count of index entries identified during this second pass through process 200 may then be compared to the this modified predetermined threshold at 250 to determine whether the count of index entries associated with resources that are responsive to the query falls below the modified predetermined threshold 252, exceeds the modified predetermined threshold 254, or satisfies the modified predetermined threshold 256. The stages 230, 240, and 250 may continue to iteratively cycle so long as the count of index entries continues to fall below the predetermined threshold.

Once it is determined 250 that the count of index entries satisfy the modified predetermined threshold, the system may obtain a set of index entries that corresponds to the index entries whose count satisfied the modified predetermined threshold at stage 250. A set of query results responsive to the received query may be generated based on the obtained set of index entries. At stage 260, the process may conclude when the search system provides a set of search results to a user device for display that is responsive to the query. Each search result of the set of search results may include a reference to a resource that is responsive to the query.

Figure 3:
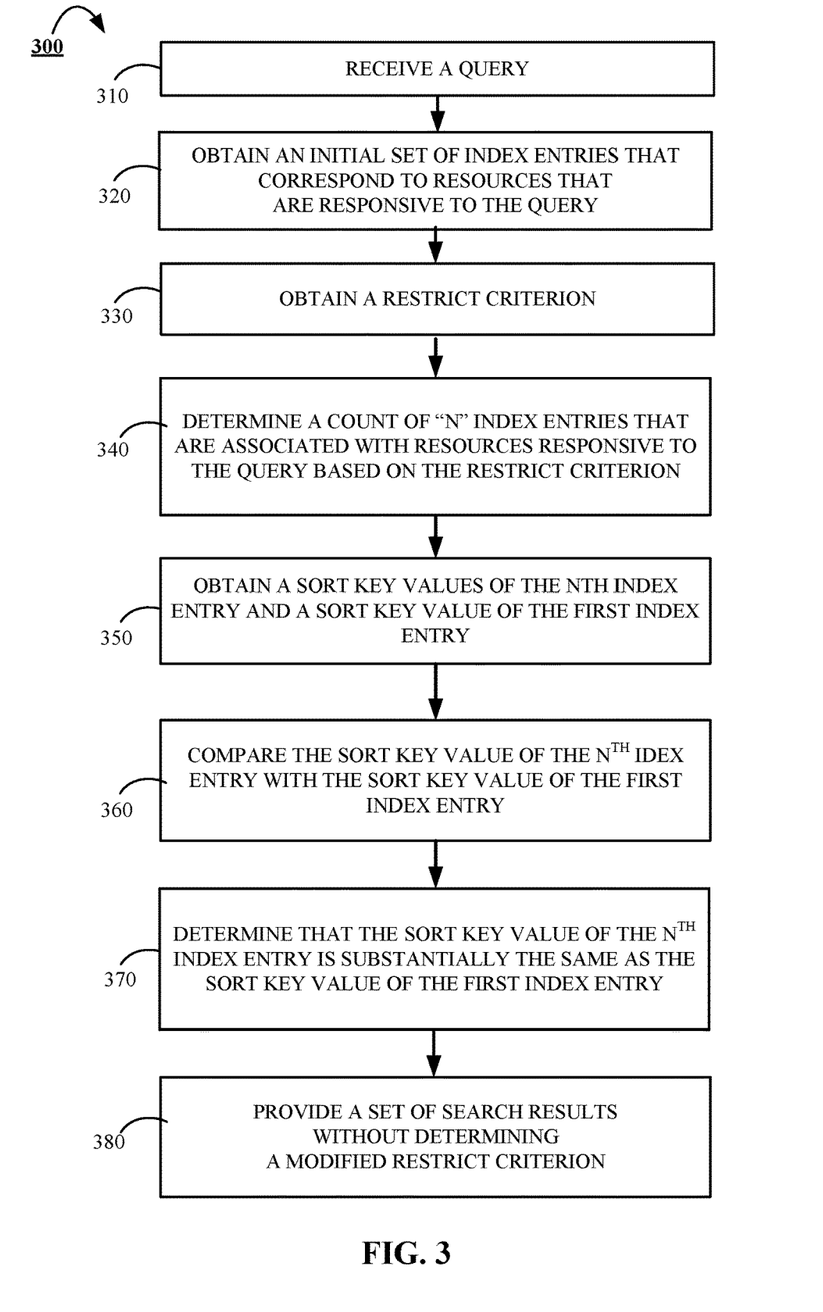
FIG. 3 is a flowchart an example of a process for performing bit-level search and retrieval of resources that are indexed using one or more sort keys.

FIG. 3 is a flowchart an example of a process 300 for performing bit-level search and retrieval of resources that are indexed using one or more sort keys. For convenience, the process 300 will be described as being performed by a system of one or more computers located in one or more locations. For example, a search system, e.g., the search system 140 of FIG. 1, appropriately programmed in accordance with this specification, can perform the process 300.

In some implementations, the process 200 may be optimized to increase performance by reducing the number of iterations required to obtain a count of index entries that satisfies the predetermined threshold. In one implementation, such an optimization may be achieved by performing a comparative analysis of the sort key values associated with each index entry of the count of index entries identified as being associated with documents that are responsive to a received query.

The system receives a query at 310. After the system receives the query, the system can obtain 320 an initial set of index entries that corresponds to resources that are responsive to the query. For instance, in response to the receipt of a query, the system may obtain an initial set of index entries that correspond to resources responsive to the received query.

The system obtains 330 a restrict criterion that may be used to facilitate search of sort key values maintained by an index of resources. The restrict criterion may be selected based on one or more features of the received query. The system may obtain a restrict criterion at stage 330 in the same manner as described above with respect to stage 230 of process 200.

At stage 340, the system determines a count of "N" index entries that correspond to resources that are responsive to the query based on the restrict criterion, wherein "N" is any positive integer. The process 340 may determine the count of "N" index entries in the same manner as described above with respect to stage 240 of process 200. For instance, the search system may determine the count of "N" index entries that correspond to resources that are responsive to the query by identifying a subsequent set of index entries from the initial set of index entries obtained at 320 that include a sort key value having the same most significant bits as the obtained restrict criterion. In some implementations, the system may use a binary search algorithm in order to search the sort key values based on the restrict criterion. By way of example, a received query may request the best quality documents that include one or more keywords. In response, the system may search a quality sort key that is associated with an index entries that correspond to each document responsive to the query keywords to identify those index entries that include a sort key value that meets the obtained restrict criterion.

The system obtains 350 one or more sort key values that correspond to a particular sort key search using the restrict criterion at stage 340. For instance, according to the example described above, the system may obtain one or more sort key values of a quality score sort key that is associated with one or more of the "N" index entries identified at stage 340. The "N" index entries may be, e.g., the "N" documents with the best quality, as ordered by the particular quality score sort key. Alternatively, the "N" index entries may be the "N" worst documents, as ordered by the particular quality score sort key. By way of example, "N" may be equal to ten. In such an example, the process may obtain a sort key value that corresponds to a quality score for a particular quality score sort key of the first index entry (e.g., the particular index entry of the ten index entries with the best quality score) and also obtain the sort key value that corresponds to a quality score of the particular quality score sort key for the tenth index entry (e.g., the particular index entry of the index entries with the lowest quality score).

The system compares 360 the sort key value of the $N^{th}$ index entry with the sort key value of the first index entry. In some implementations, the sort key values may be sort key values. The comparison of the sort key value of the $N^{th}$ index entry to the sort key value of the first index entry may yield a value that is indicative of the difference in quality between the first index entry (e.g., the particular index entry of the ten index entries with the best quality score) and the tenth index entry (e.g., the particular index entry of the index entries with the lowest quality score).

If the system determines 370 that the sort key value of the Nth index entry is substantially the same as the sort key value of the first index entry, the system may obtain a set of index entries that corresponds to the "N" index entries whose count was determined at step 340. A set of query results responsive to the query may be generated based on the obtained set of index entries. At stage 380, the system may conclude the process by providing a set of search results to a user device for display that includes multiple particular search results that each correspond to a respective resource associated with each of the "N" respective index entries.

A determination 370 that the sort key value of the $N^{th}$ index entry is substantially the same as the sort key value of the first index entry may optimize the process 200 by eliminating the need for additional iterations of stages 230, 240, and 250 of process 200. A pair of sort key values may be substantially the same if the sort key values are equal. Alternatively, or in addition, in some implementations, a pair of sort key values may be substantially the same if the difference between the sort key values does not exceed a predetermined difference threshold. Though the description of FIG. 3 set forth herein does not utilize the iterative search process described with respect to FIG. 2, the present disclosure need not be so limited. For instance, the process described in stages 350, 360, 370 may be used by the system, for example, as part of the decision making process at stage 250. Though the process described in stages 350, 360, 370, may be performed by the system at decision stage 250 on each pass, process 200 may be modified so that the process described in stages 350, 360, 370 may be performed by the system after one or more iterations of process 200.

Figure 4:
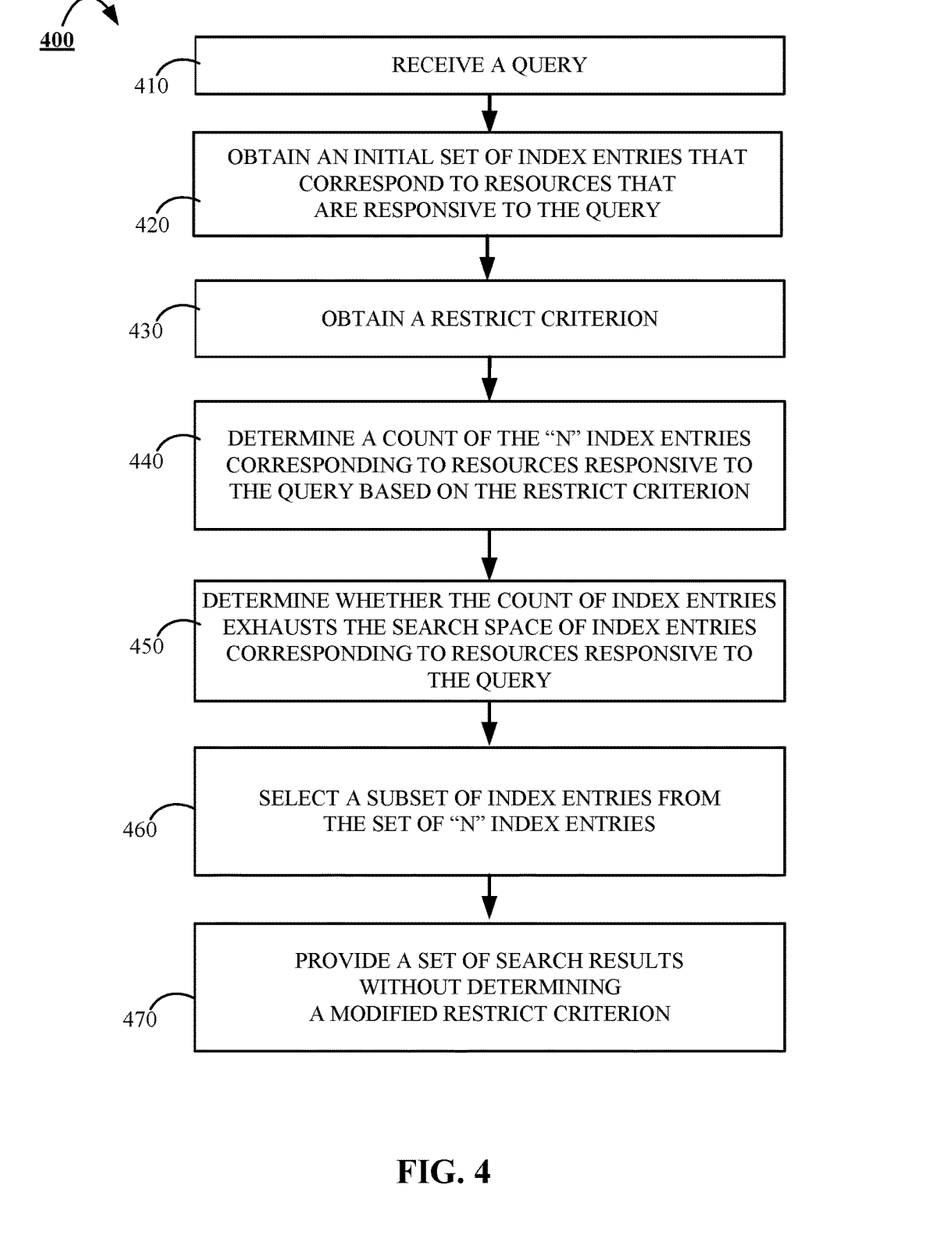
FIG. 4 is a flowchart of another example of a process for performing bit-level search and retrieval of resources that are indexed using one or more sort keys.

FIG. 4 is a flowchart of another example of a process 400 for performing bit-level search and retrieval of resources that are indexed using one or more sort keys. For convenience, the process 400 will be described as being performed by a system of one or more computers located in one or more locations. For example, a search system, e.g., the search system 140 of FIG. 1, appropriately programmed in accordance with this specification, can perform the process 400.

Yet another optimization of the process 200 may be performed to increase performance by reducing the number of iterations required to obtain a count of index entries that satisfy the predetermined threshold. In one implementation, such an optimization may be achieved by evaluating the count of index entries that are associated with resources that are responsive to the query to determine whether the count of index entries exhausts the entire search space.

The system receives a query at 410. After the system receives the query, the system can obtain 420 an initial set of index entries that corresponds to resources that are responsive to the query. For instance, in response to the receipt of a query, the system may obtain an initial set of index entries that corresponds to resources responsive to the received query.

The system obtains 430 a restrict criterion that may be used to facilitate search of sort key values maintained by an index of resources. The restrict criterion may be selected based on one or more features of the received query. The system may obtain a restrict criterion at stage 430 in the same manner as described above with respect to stage 230 of process 200.

At stage 440, the system determines a count of "N" index entries that correspond to resources that are responsive to the query based on the restrict criterion, wherein "N" is any positive integer. The process 440 may determine the count of "N" index entries in the same manner as described above with respect to stage 240 of process 200. For instance, the search system may determine the count of "N" index entries that correspond to resources that are responsive to the query by identifying a subsequent set of index entries from the initial set of index entries obtained at 420 that include a sort key value having the same most significant bits as the obtained restrict criterion. In one aspect, the system may use a binary search algorithm in order to search the sort key values based on the restrict criterion. By way of example, a received query may request the best quality documents that include one or more keywords. In response, the system may search a document quality sort key that is associated with the index entries corresponding to each document responsive to the query keywords to identify those index entries that include a sort key value that meets the obtained restrict criterion.

At stage 450, the system determines whether the count of index entries exhausts the search space of index entries that correspond to resources that are responsive to the query. For instance, it may be determined at stage 440 that a count of twenty index entries were identified, and then at 450 it may be determined that the entire search space of index entries responsive to the query comprises only twenty index entries. If the system determines that the count of index entries identified at stage 440 exhausts the search pace of index entries that correspond to resources responsive to the query, the system selects 460 a subset of index entries from the set of multiple index entries.

The selected 460 subset of index entries can include a quantity of index entries that satisfies the quantity of index entries that were sought by the search system in response to the query. By way of example, the search system may seek the ten best quality documents that are responsive to the received search query. However, the system may determine that the entire search space includes twenty responsive index entries. At that point, the system may select the ten highest ranked index entries that correspond to a resource that is responsive to the query having the best ranked quality score, based on each respective index entry's binary quality sort key value.

The system may obtain a set of index entries that corresponds to the identified subset of index entries. A set of query results responsive to the received query may be generated based on the obtained set of index entries. At stage 460, the process may conclude when the search system provides a set of search results that includes multiple particular search results that each correspond to a respective resource identified by each of the subset of index entries.

If the system determines that the count of index entries identified at stage 440 did not exhaust the search pace of index entries that correspond to resources responsive to the query, the system may follow the iterative search process described in FIG. 2 in order to identify a set of index entries that satisfy an index quantity threshold sought by the search system.

Though the description of FIG. 4 set forth herein does not utilize the iterative search process described with respect to FIG. 2, the present disclosure need not be so limited. For instance, the process described in stages 440, 450, 460 may be used, for example, as part of the programmed logic associated with decision stage 240. Though the process described in stages 440, 450, 460, may be implemented at decision stage 250 on each pass, process 200 may be modified so that the process described in stages 440, 450, 460 may be performed after one or more iterations of process 200.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A method comprising:
   storing an index that includes a respective index entry for each of a plurality of resources, wherein each index entry includes a first sort key that is associated with a corresponding sort key value;
   receiving a query from a user device;
   obtaining, based on features of the query, a first restrict criterion that (i) is to be used as a search parameter for searching sort key values and (ii) includes one or more binary value bits;
   determining, from among index entries in the index that are associated with resources that are responsive to the query, a first count of index entries in the index that are each associated with a sort key value that satisfies the restrict criterion;
   determining whether the first count of index entries satisfies a predetermined threshold;
   in response to determining that the first count of index entries satisfies the predetermined threshold, obtaining a set of index entries that corresponds to the index entries that were used to determine the first count of index entries;
   generating a set of search results responsive to the query based on the obtained set of index entries; and
   providing the set of search results to a user device for display.

2. The method of claim 1, further comprising:
   in response to determining that the first count of index entries is greater than the predetermined threshold, modifying the first restrict criterion by increasing a bit-length of the restrict criterion by one or more bits;
   determining, based on the modified first restrict criterion and the first sort key, whether an updated count of index entries responsive to the query satisfies the predetermined threshold;
   in response to determining that the updated count of index entries satisfies the predetermined threshold, obtaining a set of index entries that corresponds to the index entries that were used to determine the updated count of index entries;
   in response to determining that the updated count of index entries responsive to the query exceeds the predetermined threshold, further modifying the modified first restrict criterion by increasing a bit-length of the modified restrict criterion by one or more bits; and,
   determining, based on the further modified first restrict criterion and the first sort key, whether an updated count of index entries responsive to the query satisfies the predetermined threshold.

3. The method of claim 1, further comprising:
   in response to determining that the first count of index entries is less than the predetermined threshold, modifying the first restrict criterion by decrementing by one a bit-level prefix of the binary value;
   determining, based on (i) the modified first restrict criterion and (ii) the first sort key, whether an updated count of index entries responsive to the query satisfies the predetermined threshold;
   in response to determining that the updated count of index entries satisfies the predetermined threshold, obtaining a set of index entries that corresponds to the index entries that were used to determine the updated count of index entries;
   in response to determining that the updated count of index entries is less than the predetermined threshold, further modifying the modified first restrict criterion by decrementing by one the binary value of the bit-level prefix of the modified restrict criterion; and
   determining, based on (i) the further modified first restrict criterion and (ii) the first sort key, whether an updated count of index entries responsive to the query satisfies the predetermined threshold.

4. The method of claim 1, further comprising:
   obtaining a plurality of sort key values, wherein each sort key value of the plurality of sort key values corresponds to a sort key value that is associated with an index entry of the first count of index entries, wherein the first count of index entries includes a list of multiple index entries, wherein the multiple index entries are sorted based on the sort key value, and includes a first index entry and a last index entry;

comparing the sort key value of the first index entry to the sort key value of the last index entry; and
determining whether the sort key value that is associated with the first index entry of the multiple index entries is substantially similar to the sort key value that is associated with the last index entry of the multiple index entries.

5. The method of claim 1, further comprising:
determining whether the first count of index entries exhausts a search space of index entries that are responsive to the query; and
in response to determining that the first count of index entries exhausts a search space of index entries that are responsive to the query, selecting a subset of index entries from the first count of index entries that satisfies the predetermined threshold.

6. The method of claim 1, further comprising:
in response to determining that the count of index entries is greater than the predetermined threshold, obtaining a second sort key and a second restrict identifier;
determining, based on (i) the first restrict criterion, (ii) the first sort key, (iii) the second restrict identifier, and (iv) the second sort key, whether the number of index entries responsive to the query satisfies the predetermined threshold;
in response to determining that the number of index entries satisfies the predetermined threshold, obtaining a set of index entries that corresponds to the index entries that were used to determine the number of index entries;
in response to determining that the number of index entries responsive to the query exceeds the predetermined threshold, identifying a third sort key and a third restrict identifier; and
determining, based on (i) the first restrict criterion, (ii) the first sort key, (iii) the second restrict identifier, (iv) the second sort key, (v) the third restrict criterion, and (vi) the third sort key, whether the number of index entries responsive to the query satisfies the predetermined threshold.

7. The method of claim 1, wherein the at least one sort key value includes one or more binary value bits represents a floating point number, a double number, unsigned integer, a signed integer, or a character string.

8. A system comprising:
one or more computers and one or more storage devices storing instructions that are operable, when executed by the one or more computers, to cause the one or more computers to perform operations comprising:
storing an index that includes a respective index entry for each of a plurality of resources, wherein each index entry includes a first sort key that is associated with a corresponding sort key value;
receiving a query from a user device;
obtaining, based on features of the query, a first restrict criterion that (i) is to be used as a search parameter for searching sort key values and (ii) includes one or more binary value bits;
determining, from among index entries in the index that are associated with resources that are responsive to the query, a first count of index entries in the index that are each associated with a sort key value that satisfies the restrict criterion;
determining whether the first count of index entries satisfies a predetermined threshold;
in response to determining that the first count of index entries satisfies the predetermined threshold, obtaining a set of index entries that corresponds to the index entries that were used to determine the first count of index entries;
generating a set of search results responsive to the query based on the obtained set of index entries; and
providing the set of search results to a user device for display.

9. The system of claim 8, the operations further comprising:
in response to determining that the first count of index entries is greater than the predetermined threshold, modifying the first restrict criterion by increasing a bit-length of the restrict criterion by one or more bits;
determining, based on the modified first restrict criterion and the first sort key, whether an updated count of index entries responsive to the query satisfies the predetermined threshold;
in response to determining that the updated count of index entries satisfies the predetermined threshold, obtaining a set of index entries that corresponds to the index entries that were used to determine the updated count of index entries;
in response to determining that the updated count of index entries responsive to the query exceeds the predetermined threshold, further modifying the modified first restrict criterion by increasing a bit-length of the modified restrict criterion by one or more bits; and,
determining, based on the further modified first restrict criterion and the first sort key, whether an updated count of index entries responsive to the query satisfies the predetermined threshold.

10. The system of claim 8, the operations further comprising:
in response to determining that the first count of index entries is less than the predetermined threshold, modifying the first restrict criterion by decrementing by one a bit-level prefix of the binary value;
determining, based on (i) the modified first restrict criterion and (ii) the first sort key, whether an updated count of index entries responsive to the query satisfies the predetermined threshold;
in response to determining that the updated count of index entries satisfies the predetermined threshold, obtaining a set of index entries that corresponds to the index entries that were used to determine the updated count of index entries;
in response to determining that the updated count of index entries is less than the predetermined threshold, further modifying the modified first restrict criterion by decrementing by one the binary value of the bit-level prefix of the modified restrict criterion; and
determining, based on (i) the further modified first restrict criterion and (ii) the first sort key, whether an updated count of index entries responsive to the query satisfies the predetermined threshold.

11. The system of claim 8, the operations further comprising:
obtaining a plurality of sort key values, wherein each sort key value of the plurality of sort key values corresponds to a sort key value that is associated with an index entry of the first count of index entries, wherein the first count of index entries includes a list of multiple index entries, wherein the multiple index entries are sorted based on the sort key value, and includes a first index entry and a last index entry;
comparing the sort key value of the first index entry to the sort key value of the last index entry; and determining whether the sort key value that is associated with the first index entry of the multiple index entries is substantially similar to the sort key value that is associated with the last index entry of the multiple index entries.

12. The system of claim 8, the operations further comprising:
   determining whether the first count of index entries exhausts a search space of index entries that are responsive to the query; and
   in response to determining that the first count of index entries exhausts a search space of index entries that are responsive to the query, selecting a subset of index entries from the first count of index entries that satisfies the predetermined threshold.

13. The system of claim 8, the operations further comprising:
   in response to determining that the count of index entries is greater than the predetermined threshold, obtaining a second sort key and a second restrict identifier;
   determining, based on (i) the first restrict criterion, (ii) the first sort key, (iii) the second restrict identifier, and (iv) the second sort key, whether the number of index entries responsive to the query satisfies the predetermined threshold;
   in response to determining that the number of index entries satisfies the predetermined threshold, obtaining a set of index entries that corresponds to the index entries that were used to determine the number of index entries;
   in response to determining that the number of index entries responsive to the query exceeds the predetermined threshold, identifying a third sort key and a third restrict identifier; and
   determining, based on (i) the first restrict criterion, (ii) the first sort key, (iii) the second restrict identifier, (iv) the second sort key, (v) the third restrict criterion, and (vi) the third sort key, whether the number of index entries responsive to the query satisfies the predetermined threshold.

14. A non-transitory computer-readable medium storing software comprising instructions executable by one or more computers which, upon such execution, cause the one or more computers to perform operations comprising:
   storing an index that includes a respective index entry for each of a plurality of resources, wherein each index entry includes a first sort key that is associated with a corresponding sort key value;
   receiving a query from a user device;
   obtaining, based on features of the query, a first restrict criterion that (i) is to be used as a search parameter for searching sort key values and (ii) includes one or more binary value bits;
   determining, from among index entries in the index that are associated with resources that are responsive to the query, a first count of index entries in the index that are each associated with a sort key value that satisfies the restrict criterion;
   determining whether the first count of index entries satisfies a predetermined threshold;
   in response to determining that the first count of index entries satisfies the predetermined threshold, obtaining a set of index entries that corresponds to the index entries that were used to determine the first count of index entries;
   generating a set of search results responsive to the query based on the obtained set of index entries; and
   providing the set of search results to a user device for display.

15. The computer-readable medium of claim 14, the operations further comprising:
   in response to determining that the first count of index entries is greater than the predetermined threshold, modifying the first restrict criterion by increasing a bit-length of the restrict criterion by one or more bits;
   determining, based on the modified first restrict criterion and the first sort key, whether an updated count of index entries responsive to the query satisfies the predetermined threshold;
   in response to determining that the updated count of index entries satisfies the predetermined threshold, obtaining a set of index entries that corresponds to the index entries that were used to determine the updated count of index entries;
   in response to determining that the updated count of index entries responsive to the query exceeds the predetermined threshold, further modifying the modified first restrict criterion by increasing a bit-length of the modified restrict criterion by one or more bits; and,
   determining, based on the further modified first restrict criterion and the first sort key, whether an updated count of index entries responsive to the query satisfies the predetermined threshold.

16. The computer-readable medium of claim 14, the operations further comprising:
   in response to determining that the first count of index entries is less than the predetermined threshold, modifying the first restrict criterion by decrementing by one a bit-level prefix of the binary value;
   determining, based on (i) the modified first restrict criterion and (ii) the first sort key, whether an updated count of index entries responsive to the query satisfies the predetermined threshold;
   in response to determining that the updated count of index entries satisfies the predetermined threshold, obtaining a set of index entries that corresponds to the index entries that were used to determine the updated count of index entries;
   in response to determining that the updated count of index entries is less than the predetermined threshold, further modifying the modified first restrict criterion by decrementing by one the binary value of the bit-level prefix of the modified restrict criterion; and
   determining, based on (i) the further modified first restrict criterion and (ii) the first sort key, whether an updated count of index entries responsive to the query satisfies the predetermined threshold.

17. The computer-readable medium of claim 14, the operations further comprising:
   obtaining a plurality of sort key values, wherein each sort key value of the plurality of sort key values corresponds to a sort key value that is associated with an index entry of the first count of index entries, wherein the first count of index entries includes a list of multiple index entries, wherein the multiple index entries are sorted based on the sort key value, and includes a first index entry and a last index entry;
   comparing the sort key value of the first index entry to the sort key value of the last index entry; and
   determining whether the sort key value that is associated with the first index entry of the multiple index entries is substantially similar to the sort key value that is associated with the last index entry of the multiple index entries.

18. The computer-readable medium of claim 14, the operations further comprising:
   determining whether the first count of index entries exhausts a search space of index entries that are responsive to the query; and
   in response to determining that the first count of index entries exhausts a search space of index entries that are responsive to the query, selecting a subset of index entries from the first count of index entries that satisfies the predetermined threshold.

19. The computer-readable medium of claim 14, the operations further comprising:
   in response to determining that the count of index entries is greater than the predetermined threshold, obtaining a second sort key and a second restrict identifier;
   determining, based on (i) the first restrict criterion, (ii) the first sort key, (iii) the second restrict identifier, and (iv) the second sort key, whether the number of index entries responsive to the query satisfies the predetermined threshold;
   in response to determining that the number of index entries satisfies the predetermined threshold, obtaining a set of index entries that corresponds to the index entries that were used to determine the number of index entries;
   in response to determining that the number of index entries responsive to the query exceeds the predetermined threshold, identifying a third sort key and a third restrict identifier; and
   determining, based on (i) the first restrict criterion, (ii) the first sort key, (iii) the second restrict identifier, (iv) the second sort key, (v) the third restrict criterion, and (vi) the third sort key, whether the number of index entries responsive to the query satisfies the predetermined threshold.

* * * * *

UNITED STATES PATENT AND TRADEMARK OFFICE
CERTIFICATE OF CORRECTION

PATENT NO. : 10,235,432 B1
APPLICATION NO. : 15/204869
DATED : March 19, 2019
INVENTOR(S) : Markov et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this
Tenth Day of December, 2019

Andrei Iancu
*Director of the United States Patent and Trademark Office*